10

3,134,815
PRODUCTION OF AMINE FLUORIDES
George M. Burkert and Kenneth A. Walsh, Lakeland, Fla., assignors to International Minerals & Chemical Corporation, a corporation of New York
No Drawing. Filed Nov. 9, 1959, Ser. No. 851,540
15 Claims. (Cl. 260—583)

The present invention generally relates to the production of amine fluorides. More particularly it relates to the production of amine fluorides from fluosilicic acid and amines.

Amine fluorides are useful organic fluorinating agents. Anhydrous HF may also readily be produced from amine fluorides.

Fluorine-containing gases are produced during the manufacture of fertilizers, phosphoric acid, phosphates and other phosphorus-containing materials from phosphorus-containing minerals such as fluorapatite and phosphate rock. These minerals contain fluorine and also contain silica and iron as well as other elements. When such minerals are chemically treated with an acid, such as phosphoric acid, sulfuric acid, nitric acid, hydrochloric acid, or mixtures of two or more of these acids, which type of treatment is relatively common in preparing more useful materials from these minerals, silicon tetrafluoride is liberated. Silicon tetrafluoride is also liberated when wet process phosphoric acid prepared from phosphate rock or fluorapatite is concentrated by evaporation techniques. The liberated silicon tetrafluoride is usually recovered by absorption in water or other aqueous solution. When the silicon tetrafluoride is dissolved in water, fluosilicic acid, $H_2SiF_6$, is formed.

It is an object of the present invention to provide a novel process for preparing amine fluorides.

It is a further object of the present invention to provide a method of preparing amine.HF addition compounds from fluosilicic acid.

These and other objects and advantages of the present invention will be apparent from the following detailed description of the invention.

Generally, the method of the present invention comprises mixing an amine with fluosilicic acid, thereby effecting the formation of an amine fluoride.

While the present invention finds particular utilization in preparing amine fluorides from fluosilicic acid obtained by absorbing gas evolved during an acid treatment of phosphate material in an aqueous medium, it is to be understood that aqueous fluosilicic acid solutions prepared by other methods may be used in the process of this invention. This will be apparent to those skilled in the art as the description of the invention progresses.

As hereinbefore set forth, in the chemical treatment of fluorapatite or phosphate rock and during the evaporation of wet process phosphoric acid, a gas containing silicon tetrafluoride as well as phosphorus impurities is evolved. These gases are scrubbed with an aqueous medium to recover the fluorine thereby forming an aqueous solution of fluosilicic acid contaminated with phosphorus. The absorber effluent usually has a fluosilicic acid concentration between about 2% and 30% by weight.

This aqueous solution of fluosilicic acid is then reacted with an amine to form an amine fluoride. The reaction may, generally, be represented by the formula $$6 \text{ Amine} + H_2SiF_6 + 2H_2O \rightarrow 6 \text{ Amine.HF} + SiO_2$$

Any suitable amine may be used in the process of this invention. It is preferred that the amine be substantially soluble in water and it is also preferred that the resultant amine fluoride be substantially soluble in water. Primary, secondary, and/or tertiary amines may be used, as well as mixtures of two or more of such amines. When a primary amine, generally represented by the formula $RNH_2$, is used, it is preferred that R is an organic radical containing from about one to about ten carbon atoms. When a secondary amine, generally represented by the formula $R'R''NH$ is utilized, it is preferred that each R is an organic radical containing 1, 2, 3, or 4 carbon atoms. Of the tertiary amines, generally represented by the formula $R'R''R'''N$, it is preferred that each R is an organic radical containing 1, 2, or 3 carbon atoms. In each case, whether the amine be primary, secondary or tertiary, R may be an alkyl group; however, it may also be any other suitable group; for example, triethanol amine is a specific tertiary amine which may be used in the process.

When the substantially water soluble amine is commingled with fluosilicic acid in aqueous solution, the amine fluoride, which may be denominated an amine-HF addition compound, and silica are formed. When a substantially water soluble amine is used, the corresponding amine fluoride formed is also substantially water soluble, and may, accordingly, be dissolved in water. The insoluble silica may then readily be separated from the aqueous solution of the amine fluoride by any suitable method such as filtration, decantation, centrifugation, etc. As the length of the carbon chain in the amine increases, the water solubility of the corresponding amine fluoride decreases, making the separation relatively more difficult. When desired, the aqueous solution of amine fluoride may be evaporated to remove the water.

The concentration of the fluosilicic acid is not a critical factor and any suitable concentration may be used. It is preferred that from about 2 to about 30% fluosilicic acid be used.

The reaction between between the amine and the fluosilicic acid takes place in aqueous solution at ambient conditions, however, lower or higher temperatures may be used when desired. The temperature should, of course, be maintained below the decomposition temperature of the reactants or products and since the reaction takes place in aqueous medium, the conditions of temperature and pressure should be such as to maintain a liquid water phase. The temperature should also, of course, be sufficiently high so that the amine is substantially completely soluble at the reaction conditions.

In order to give a fuller understanding of the invention, but with no intention to be limited thereto, the following specific examples are given.

*Example I*

Fifty grams of a 23% fluosilicic acid solution was added to 37.2 grams of an aqueous 40% methylamine solution at ambient temperature. The reaction mixture became hot and thick. 75 grams of water was added to thin the slurry and the mixture was agitated for one hour. The silica precipitate was filtered off. The filtrate was an aqueous solution of $CH_3NH_2.HF$ and had a pH of 7. The filtrate was evaporated and a white crystalline product of $CH_3NH_2.HF$ was obtained.

*Example II*

26.3 grams of a 23% fluosilicic acid solution was added to 25 grams of diisopropyl amine at ambient temperature. The reaction mixture became warm. After about one minute, silica formation began and proceeded until the solution became thick. 100 grams of water was added and the mixture was stirred for one hour. The silica precipitate was filtered off. The filtrate was a water white solution of $(C_3H_7)_2NH.HF$ and had a pH of about 7.

*Example III*

25.9 grams of a 23% fluosilicic acid solution was added to 35.72 grams of triethanol amine. The reaction mixture became warm and turbid. After stirring for several minutes, the mixture became thick. 100 grams of water was added and the mixture was stirred for one hour. The silica precipitate was filtered off. The filtrate was a water white solution of $(CH_2CH_2OH)_3N \cdot HF$ and had a pH of about 7.5.

*Example IV*

In substantially the same manner as set forth in the above examples, fluosilicic acid was reacted with primary isopropyl amine, primary monobutyl amine, primary hexyl amine and primary octyl amine. In each case the corresponding amine fluoride was obtained.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A method of preparing an amine fluoride which comprises commingling an amine and fluosilicic acid in an aqueous solution, said amine and said fluosilicic acid being utilized in the ratio of about 6 moles of amine per mole of fluosilicic acid, said amine selected from the group consisting of primary amines represented by the formula $RNH_2$ wherein R is an alkyl group containing from 1 to about 10 carbon atoms, secondary amines represented by the formula R'R"NH wherein each R is an alkyl group containing 1 to 4 carbon atoms, tertiary amines represented by the formula R'R"R'"N wherein each R is an alkyl group containing 1 to 3 carbon atoms, and triethanol amine.

2. The method of claim 1 wherein said amine is a primary amine.

3. The method of claim 1 wherein said amine is a secondary amine.

4. The method of claim 1 wherein said amine is a tertiary amine.

5. The method of claim 1 wherein said amine is triethanol amine.

6. The method of claim 1 wherein said amine is methyl amine.

7. The method of claim 1 wherein said amine is diisopropyl amine.

8. A method of preparing an amine fluoride which comprises commingling a substantially water soluble amine and fluosilicic acid in aqueous solution, said amine and said fluosilicic acid being utilized in the ratio of about 6 moles of amine per mole of fluosilicic acid, to form a substantially water soluble amine fluoride and silica and separating the amine fluoride from the silica, said amine selected from the group consisting of primary amines represented by the formula $RNH_2$ wherein R is an alkyl group containing from 1 to about 10 carbon atoms, secondary amines represented by the formula R'R"NH wherein each R is an alkyl group containing 1 to 4 carbon atoms, tertiary amines represented by the formula R'R"R'"N wherein each R is an alkyl group containing 1 to 3 carbon atoms, and triethanol amine.

9. The method of claim 8 wherein said amine is a primary amine containing from about one to about ten carbon atoms in the molecule.

10. The method of claim 8 wherein said amine is a secondary amine generally represented by the formula R'R"NH wherein each R contains from about one to about four carbon atoms.

11. The method of claim 8 wherein said amine is a tertiary amine generally represented by the formula R'R"R'"N wherein each R contains from about one to about three carbon atoms.

12. The method of claim 9 wherein said primary amine is isopropyl amine.

13. The method of claim 9 wherein said primary amine is primary monobutyl amine.

14. The method of claim 9 wherein said primary amine is primary hexyl amine.

15. The method of claim 9 wherein said primary amine is primary octyl amine.

References Cited in the file of this patent

UNITED STATES PATENTS 1,917,463     Salzberg et al.             July 11, 1933